(12) United States Patent
Ioffe

(10) Patent No.: US 9,122,705 B1
(45) Date of Patent: Sep. 1, 2015

(54) SCORING HASH FUNCTIONS

(75) Inventor: Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 668 days.

(21) Appl. No.: 13/421,750

(22) Filed: Mar. 15, 2012

Related U.S. Application Data

(60) Provisional application No. 61/453,052, filed on Mar. 15, 2011.

(51) Int. Cl.
*G06F 17/30* (2006.01)

(52) U.S. Cl.
CPC .................. *G06F 17/30247* (2013.01)

(58) Field of Classification Search
None
See application file for complete search history.

(56) References Cited

U.S. PATENT DOCUMENTS

| | | | |
|---|---|---|---|
| 7,761,466 B1 * | 7/2010 | Eshghi | 707/772 |
| 8,195,672 B2 * | 6/2012 | Monga | 707/749 |
| 8,352,494 B1 * | 1/2013 | Badoiu | 707/772 |
| 8,712,156 B2 * | 4/2014 | Bronstein et al. | 382/181 |
| 8,768,105 B2 * | 7/2014 | Luo et al. | 382/305 |
| 8,792,728 B2 * | 7/2014 | Tang et al. | 382/203 |
| 2010/0027895 A1 * | 2/2010 | Noguchi et al. | 382/224 |
| 2010/0158391 A1 * | 6/2010 | Cunningham et al. | 382/209 |
| 2010/0185615 A1 * | 7/2010 | Monga | 707/736 |
| 2011/0170781 A1 * | 7/2011 | Bronstein et al. | 382/190 |

* cited by examiner

*Primary Examiner* — Robert Beausoliel, Jr.
*Assistant Examiner* — Susan F Rayyan
(74) *Attorney, Agent, or Firm* — Fish & Richardson P.C.

(57) ABSTRACT

Methods, systems, and apparatus, including computer programs encoded on a computer storage medium, for scoring hash functions. In one aspect, a method includes computing one or more first performance indicators for an objective function computed on each of one or more sets of input data elements using a set of hash functions. A first overall performance indicator is computed using each of the computed performance indicators. The candidate hash function is added to the set of hash functions to generate a second set of hash functions. Second performance indicators are computed for the objective function computed on each of the sets of input data elements using the second set of hash functions. A second overall performance indicator is computed using each of the computed second performance indicators, and a score is computed for the candidate hash function using the first overall performance indicator and the second overall performance indicator.

19 Claims, 4 Drawing Sheets

SCORING HASH FUNCTIONS

CROSS-REFERENCE TO RELATED APPLICATIONS

This application claims the benefit under 35 U.S.C. §119 (e) of U.S. Provisional Application Ser. No. 61/453,052, filed on Mar. 15, 2011 entitled "SCORING HASH FUNCTIONS," the entirety of which is hereby incorporated by reference.

BACKGROUND

This specification relates to data processing.

For large datasets, it is useful to find representations for data elements that provide compact storage and efficient distance computation between elements. Hash functions are typically used to represent the extracted features of input data with descriptors that require less storage space and whose similarity determination is computationally less expensive than using the original input data. Locality-sensitive hashing is one conventional method that uses a particular family of probabilistic hash functions to map similar input data to similar hashes.

Various types of data can be input to a hash function. A hash function maps each element of input data to a sequence of hash characters called a hash, where each hash character corresponds to a unique bit string. A hash collision occurs when a hash function maps two input data elements to the same hash. The feature representations of the input data elements can be hashed multiple times to generate multiple hashes for each input data element. The number of hash collisions between respective hashes for the two input data elements gives an empirical approximation of the overall hash collision probability, which in turn gives an approximation of the distance between the input data elements.

For example, a computer process can conventionally compute the similarity between two images by extracting features of each image to create a feature representation and can then compare the respective feature representations. Features of an image can include, for example, histograms of image color or grayscale data, edges, corners, image centers of gravity, or other image points of interest. The features extracted from an image can be concatenated into a feature representation. The feature representations are typically compared by various distance metrics, for example, the Jaccard distance, the L1 distance, or the L2 distance. However, these distance metrics may be computationally expensive when performed on the original feature representation. In addition, the variety of features extracted from an image may require storage space that is orders of magnitude larger than the storage space required to store the image itself. Consequently, hash functions are typically used to reduce the storage requirements of the feature representations and to improve the performance of distance computation between the images.

SUMMARY

This specification describes technologies relating to scoring hash functions.

Probabilistic hash functions can be used to approximate the similarity or distance between input images. A subset of hash functions can be selected from a larger set of hash functions from the same family of probabilistic hash functions. In many applications, it is desirable to select only the best hash functions available for a particular task. To select the best hash functions, a score can be computed for each hash function in the family of hash functions. Highest-scoring hash functions can then be used in a final set of hash functions to be used for the particular task.

Cross validation methods can be used to select the hash functions in such a way that reduces the probability of overtraining on training data. These methods also allow the hash functions to be evaluated even when used in arbitrarily complex objective functions.

In general, one innovative aspect of the subject matter described in this specification can be embodied in methods that include the actions of computing one or more first performance indicators for an objective function computed on each of one or more sets of input data elements using a set of hash functions; computing a first overall performance indicator using each of the computed performance indicators; adding a candidate hash function to the set of hash functions to generate a second set of hash functions; computing one or more second performance indicators for the objective function computed on each of the one or more sets of input data elements using the second set of hash functions; computing a second overall performance indicator using each of the computed second performance indicators; and computing a score for the candidate hash function using the first overall performance indicator and the second overall performance indicator. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The objective function classifies the sets of input data elements using the set of hash functions and the first or second performance indicator is a likelihood of a correct classification. The first or second overall performance indicator is a product of the first performance indicator and the second performance indicator or a sum of a logarithm of the first performance indicator and the second performance indicator. The score is based on a difference in log likelihood between the second overall performance indicator and the first overall performance indicator. The objective function ranks the sets of input data elements using the set of hash functions and the first or second performance indicator is a likelihood of a correct ranking. The sets of input data elements are image training triplets, wherein each image training triplet includes a query image Q, a first image A, and a second image B, wherein the first or second performance indicator is a measure of the likelihood that a distance function using the set of hash functions will correctly rank the query image Q of each image training triplet as more similar to the first image A of each image training triplet than to the second image B of each image training triplet. The likelihood of a correct triplet ranking is computed based at least in part on a distance between each Q and each A and a distance between each Q and each B. The score is based on a difference between the first overall performance indicator and the second overall performance indicator. The first or second performance indicator is a likelihood or a probability of the objective function correctly performing a task. The first or second overall performance indicator is a product of the first performance indicator and the second performance indicator or a sum of a logarithm of the first performance indicator and the second performance indicator.

Another innovative aspect of the subject matter described in this specification can be embodied in methods that include the actions of selecting a sample size and sampling a number of hash functions from a collection of hash functions, the number being at least equal to the sample size; computing a score for each of the sampled hash functions; selecting one or more of the sampled hash functions for a final set of hash functions based at least in part on the score for each respective hash function; evaluating an objective function on one or more input data elements using the final set of hash functions; and computing a quality score for the sample size based at least in part on a performance of the objective function using the final set of hash functions on the one or more input data elements.

These and other embodiments can each optionally include one or more of the following features. Selecting one or more of the sampled hash functions for an objective function based at least in part on the score for each respective hash function includes selecting a hash function with a highest score for a final set of hash functions. The actions further include dividing a dataset of input data elements into a training subset and a validation subset, and wherein selecting a hash function with a highest score for a final set of hash functions includes computing a score for each of the hash functions in the sample using the training subset, and adding the highest-scoring hash function in the sample to the final set of hash functions; evaluating the objective function on the validation subset using the final set of hash functions; and computing a quality score for the sample size based at least in part on a performance of the objective function on the validation subset using the final set of hash functions. The actions further include dividing the dataset into a different training subset and a different validation subset; sampling a number of hash functions from the collection of hash functions, the number being at least the sample size; computing a score for each of one or more sampled hash functions using the different training subset; selecting one or more of the sampled hash functions for a final set of hash functions based at least in part on the score for each respective hash function computed using the different training subset; evaluating the objective function on the different validation subset using the final set of hash functions; computing a second quality score for the sample size based at least in part on a performance of the objective function on the different validation subset; and averaging the quality score and second quality score to compute an overall quality score for the sample size. The actions further include selecting a different second sample size and sampling a number of hash functions from a collection of hash functions, the number being at least the second sample size; computing a score for each of the hash functions sampled for the second sample size; selecting one or more of the hash functions sampled for the second sample size for a second final set of hash functions based at least in part on the score for each respective hash function; evaluating an objective function on one or more input data elements using the second final set of hash functions; computing a second quality score for the second sample size based at least in part on a performance of the objective function using the second final set of hash functions on the one or more input data elements; and comparing the quality score and the second quality score and selecting a sample size with a highest quality score. The input data elements comprise image training triplets, wherein each triplet comprises a query image Q, a first image A, and second image B, and wherein the objective function calculates whether Q is closer to A or B.

Particular embodiments of the subject matter described in this specification can be implemented so as to realize one or more of the following advantages. Scoring hash functions improves the performance of an objective function by providing for selection of only the most effective hash functions. The selection process provides a method for selecting the best hash functions even for arbitrarily complex objective functions, such as objective functions used for computing image similarity and ranking.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
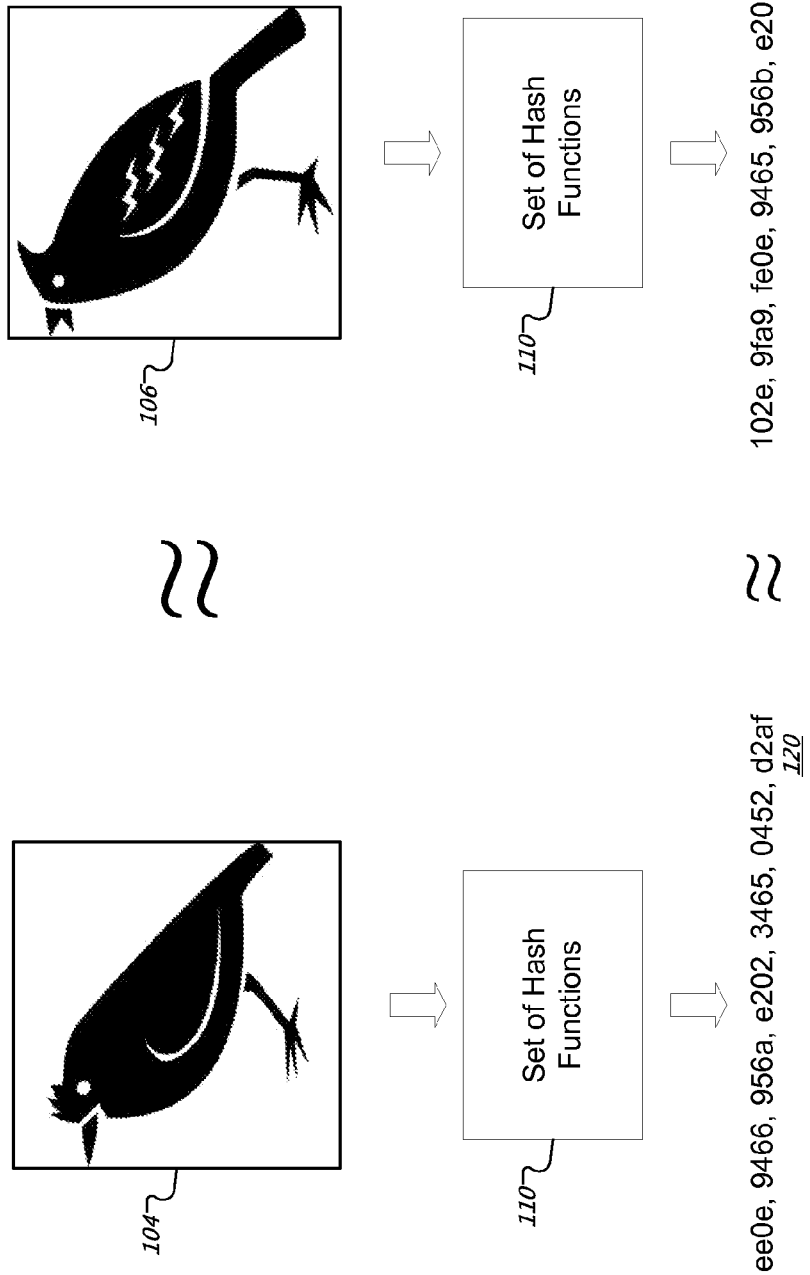
FIG. 1 is a diagram of inputs and outputs of a set of hash functions for computing the similarity between two images.

FIG. 1 is a diagram of inputs and outputs of a set of hash functions for computing the similarity between two images. FIG. 1 is an example application for using a family of random hash functions on a pair of images. However, hash functions can be useful for input data of any type, including text data.

In FIG. 1, the similarity between image 104 and image 106 can be approximated by hashing. A set of hash functions 110 is used to compute a set of hashes for each image. The set of hash functions 110 takes as input data the extracted features of image 104 and produces hashes 120. The same set of hash functions 110 also takes as input the extracted features of image 106 and produces hashes 130. The number of hash collisions between respective hashes in hashes 120 and hashes 130 can be used to approximate the similarity between images 104 and 106.

Using an infinite number of hash functions in the set of hash functions 110 would give a complete reconstruction of the probability of a hash collision. However, in practice only a finite subset of hash functions can be used. Identifying the best hash functions to include in the set of hash functions 110 can improve the accuracy of the probability of a hash collision, and can therefore improve the computation of the similarity between images.

Figure 2:
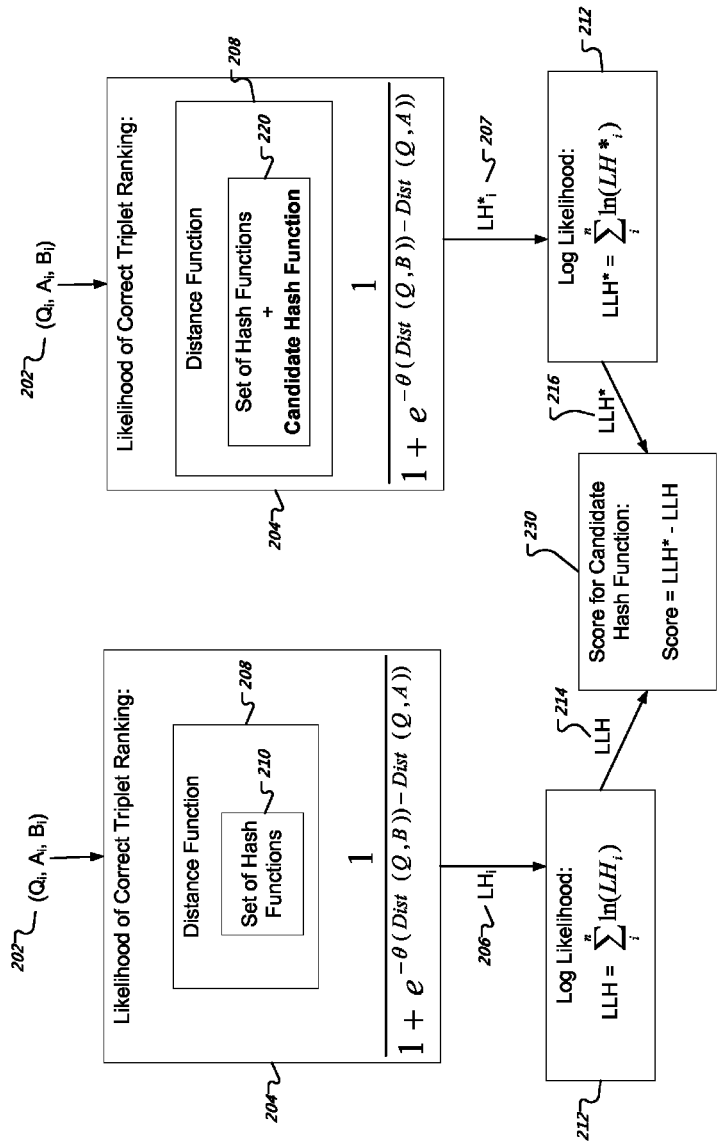
FIG. 2 is a block diagram representing an example process for scoring a hash function.

FIG. 2 is a block diagram 200 representing an example process for scoring a hash function. A candidate hash function can be assigned a score to indicate the degree to which the hash function improves the performance of a particular objective function. For example, the score can indicate the degree to which the candidate hash function improves the accuracy of determining whether two input images are similar. The process as shown in FIG. 2 can be used to score any family of random hash functions, including MinHash, random projections, spectral hashing, and other locality sensitive hashing methods. The performance of hash functions from these hashing methods can be measured on any objective function. The objective function is computed on sets of input data elements with the hash functions operating on each input data element.

The example process in FIG. 2 uses sets of input data elements that are triplets of training images. The dataset 202 contains the triplets of training images $(Q_i, A_i, B_i)$ that can be used to compute a score for each candidate hash function. Each triplet $(Q_i, A_i, B_i)$ of the dataset 202, where i is an index value identifying the particular images of the triplet, contains a query image, Q, and two images A and B such that Q is considered to be more similar to A than B. In some implementations, the similarity between A and B is not considered or is undefined. In some implementations, the triplet images have been rated by human raters who have determined that Q is more similar to A than B. For the dataset of triplets 202, a set of hash functions 210 is used to compute a log likelihood that a given set of hash functions will correctly determine that Q is more similar to A than B when the hash functions are used to compute a distance between 1) Q and A and 2) Q and B, given a defined distance function. The example process in FIG. 2 can also be used to score hash functions for a variety of other objective functions. For example, the example process can operate on sets of input data elements that are pairs of images, where the process computes a probability of the set of hash functions 210 correctly computing that the similarity of the pair is either above or below a threshold.

Each triplet $(Q_i, A_i, B_i)$ of the dataset 202 can be used to compute a performance indicator for the set of hash functions 210 used by the objective function. For example, the performance indicator can be a likelihood $LH_i$ 206 that a distance function 208 using a set of hash functions 210 will correctly rank the triplet. A correct triplet ranking occurs when the distance between $Q_i$ and $A_i$ is computed to be less than the distance between $Q_i$ and $B_i$. The likelihood $LH_i$ 206 of a correct triplet ranking is computed by likelihood function 204. The likelihood function 204 is a function of a distance function 208, which depends on a set of hash functions 210.

The distance function 208 can be specific to the chosen family of hash functions, from which the set of hash functions 210 is selected. In general, the distance function uses the set of hash functions 210, which take as input each image of the image triplets and outputs hashes for each image. The hashes for the input images can be used to compute the distances between the images in the input image pairs. In some implementations, the distance is the number of hash collisions between the generated hashes. In some implementations, the distance function also depends on the norms of the feature representations of an input image pair. Norms of the features representations can be, for example, L1 or L2 norms. An L1 norm for a feature representation can be computed as:

$$L1 \text{ norm} = \sum_i |x_i|,$$

for each feature $x_i$ in the feature representation. An L2 norm for a feature representation can be computed as:

$$L2 \text{ norm} = \sqrt{\sum_i x_i^2}.$$

The likelihood of a correct triplet ranking can be computed as:

$$\frac{1}{1 + e^{-\theta(Dist(Q,B) - Dist(Q,A))}},$$

where Dist(Q,B) is the distance between each $Q_i$ and $B_i$ using distance function 208, and Dist (Q, A) is the distance between each $Q_i$ and $A_i$ using the distance function 208. An additional scaling parameter $\theta$ can be optimized for a given distance function.

The likelihoods $LH_i$ 206 can be used to compute an overall performance indicator for the given set of hash functions 210. In some implementations, the product of the likelihoods $LH_i$ 206 of each triplet in the dataset 202 is computed to give an overall likelihood of a correct triplet ranking for the given set of hash functions 210. Alternatively, the sum of the logarithms of the likelihoods $LH_i$ 206 can be computed with a log likelihood function 212 to give the log likelihood LLH 214 of a correct triplet ranking for the set of hash functions 210.

A score for a given candidate hash function can be based on the change in the computed overall performance indicator after the candidate hash function is added to the existing set of hash functions. For example, the score can be based on the change in the computed log likelihood 214. Adding a candidate hash function to the set of hash functions 210 creates the set of hash functions 220.

With the new set of hash functions 220, each triplet $(Q_i, A_i, B_i)$ of the dataset 202 can similarly be used to compute a performance indicator for the set of hash functions 220, e.g., the likelihood of a correct triplet ranking With the candidate hash function added to the set of hash functions 220, the new likelihood 207 is denoted by $LH^*_i$. For each $LH^*_i$, 207, a new overall performance indicator for the new set of hash functions 220 can be computed. In some implementations, the overall performance indicator is computed by the log likelihood function 212 to compute a log likelihood LLH* 216.

A scoring function 230 can compute a score for the candidate hash function by comparing the change in overall performance indicators for the set of hash functions 210 and the new set of hash functions 220. In some implementations, the scoring function computes the score as the difference between LLH* 216 and LLH 214. The score can indicate how much better (or worse) the log likelihood of correct rankings is when the candidate hash function is included in the distance computation. After being scored, hash functions can be ranked to indicate which hash functions have the most influence on the log likelihood of a correct triplet ranking.

In some implementations, a score for the candidate hash function can be computed by evaluating the objective function using only the candidate hash function to be scored. In other words, the score for the candidate hash function need not depend on other hash functions in a set of hash functions, e.g., the set of hash functions 210 or 220. When using only the candidate hash function, the score can be computed directly from a performance indicator for the candidate hash function, e.g., the likelihood of a correct triplet ranking.

Figure 3:
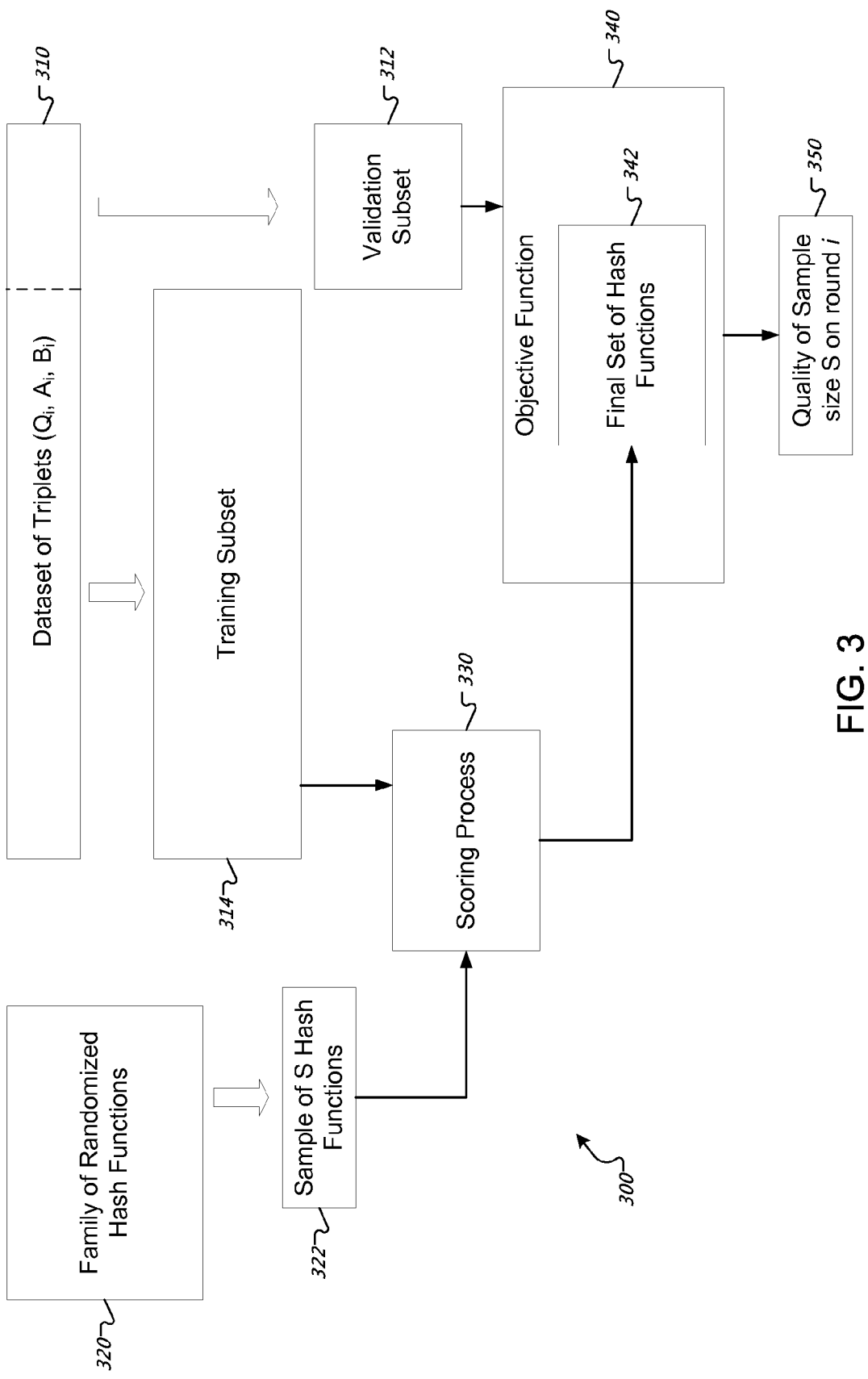
FIG. 3 is a block diagram representing an example process for choosing an optimal size for a sample of hash functions.

FIG. 3 is a block diagram of an example process 300 for choosing an optimal size for a sample of hash functions. The process 300 is one example method for using the computed scores of hash functions to select a final subset of hash functions that optimize an objective function.

The objective function is the particular task for which the set of hash functions are being chosen. One example objective function is correctly ranking as many image triplets $(Q_i, A_i,$ $B_i$) as possible in a dataset, where a correct ranking occurs when $Q_i$ is determined to be more similar to $A_i$ than $B_i$.

Another example objective function is ranking all $A_i$ and $B_i$ images in a dataset of triplets in order of distance to a particular $Q_i$ image. The objective function can further assign a reward or penalty based on whether $A_i$ and $B_i$ were within a threshold number of images T to $Q_i$ in the ranking. The reward or penalty may also be weighted by the overall ranking of $A_i$ and $B_i$. This objective function can additionally be iterated for all T values, e.g. from 1 to 30.

A variety of methods can be used to choose a final set of hash functions, given a score for each hash function. For example, one method is to choose the final set of hash functions as the top N highest-scoring hash functions, for a task that requires N hash functions. Alternatively, the process 300 uses cross validation to improve the ability of the selected hash functions to generalize to unseen data. The example process 300 can thus correct for overtraining effects that can occur as a result of using other techniques, for example, selecting only the highest-scoring N hash functions.

The process 300 can operate on a dataset of triplets ($Q_i$, $A_i$, $B_i$) 310, where $Q_i$ is considered to be more similar to $A_i$ than $B_i$. The cross validation procedure divides the dataset 310 into a training subset 314 and a validation subset 312.

From a family of random hash functions 320, a sample of S hash functions 322 is chosen. The hash functions in the sample are scored with a scoring process 330. The scoring process 330 can be similar to the scoring process described with respect to FIG. 2. One or more of the highest-scoring hash functions is added to a final set of hash functions 342. An objective function 340 is evaluated on the validation subset 312 using the final set of hash functions. The performance of the objection function 340 is used to compute the quality 350 of cross validation round i for sample size S. The process 300 can be repeated multiple times, each time dividing the dataset 310 into a different training subset 314 and a different validation subset 312.

Figure 4:
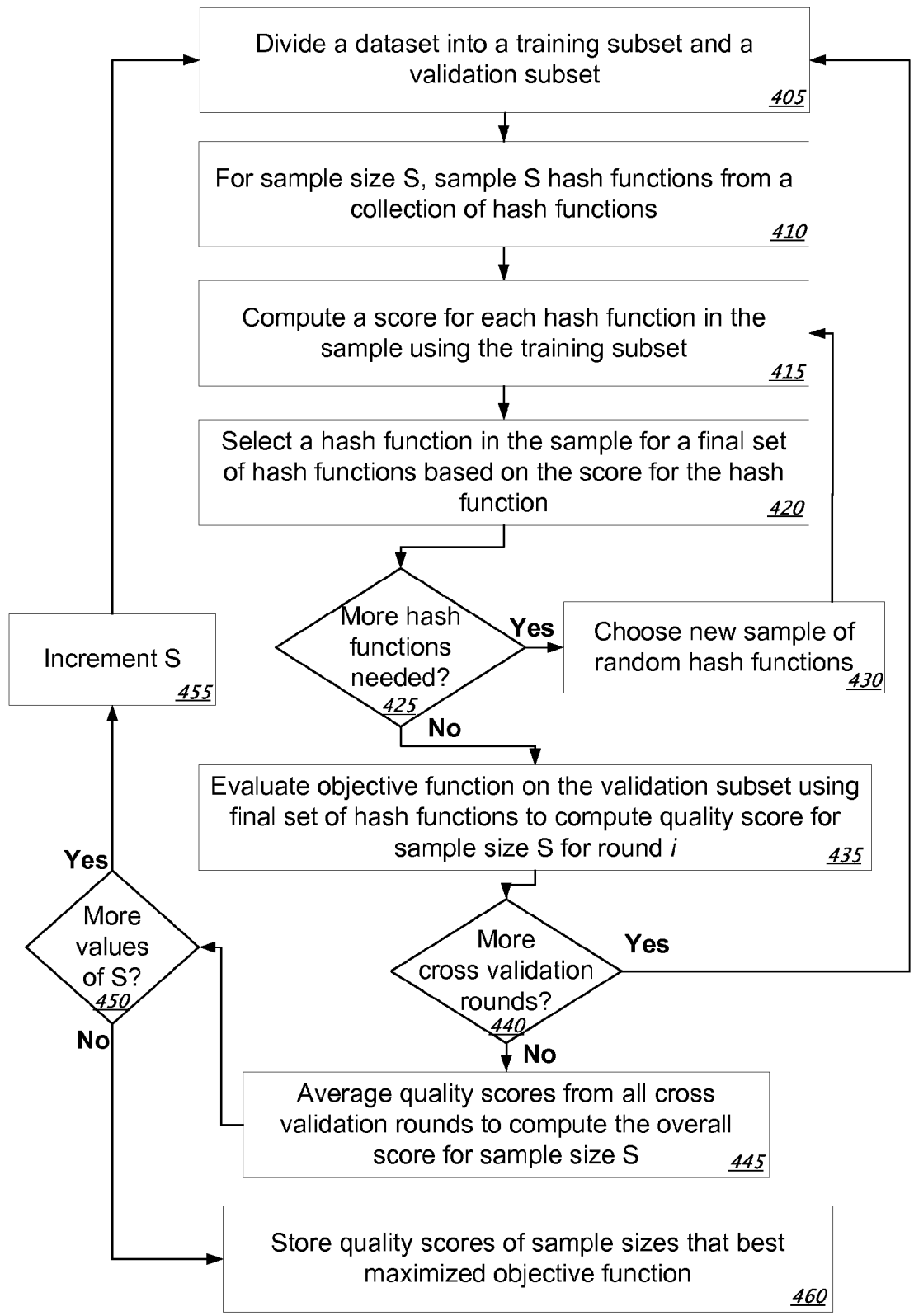
FIG. 4 is a flow chart for an example process for choosing an optimal size for a sample of hash functions.

FIG. 4 is a flow chart for an example process 400 for choosing an optimal size for a sample of hash functions. The process 400 can be implemented as the cross validation procedure as shown in FIG. 3. The process 400 will be described as being performed by a system that includes one or more computers.

The system divides a dataset into a training subset and a validation subset (405). In general, the hash functions will be scored using the training subset, and the objective function will be evaluated using the validation subset. In a cross validation procedure, this process is repeated with different segments of the dataset serving as the validation data, with the remainder serving as the training data. For example, the dataset can include image triplets ($Q_i$, $A_i$, $B_i$). Twenty percent of the triplets can be held out as the validation data on each round, with the other eighty percent of the triplets used as the training subset to score the hash functions, with the process being performed five times.

For a sample size S, the system samples S hash functions from a collection of hash functions (410). The collection of hash functions can be a family of random hash functions. Because the process 400 is designed to find the optimal sample size S, the initial sample size S can be, e.g., 1.

The system computes a score for each hash function in the sample using the training subset (415). The system can use a scoring process as shown in FIG. 2 to score the hash functions using the training subset. In some implementations, the score for each hash function is the change in log likelihood of a correct image triplet ranking over the training subset when that hash function is added to a set of hash functions.

The system selects a hash function in the sample for a final set of hash functions based on the score for the hash function (420). The system can select the highest-scoring hash function in the sample and add the hash function to a final set of hash functions. In some implementations, the remaining S-1 hash functions are cleared from the sample so that S new hash functions can be sampled independently on the next selection. In some other implementations, the remaining S-1 hash functions remain in the sample.

The system determines whether more hash functions are needed for the objective function (425). The number of hash functions required depends on the particular objective function, and a particular objective function can require thousands or millions of hash functions. If the final set of hash functions is not yet complete, the system can choose a new sample of random hash functions from the family of hash functions (430). The system then recomputes scores for the hash functions in the sample (branch to 415).

If the final set of hash functions is complete, the system evaluates the objective function on the validation subset using the final set of hash functions to compute a quality score for sample size S for round i (435). The system can compute a performance indicator based on the evaluation of the objective function. For example, using the final set of hash functions, the objective function might correctly rank 70% of image triplets in the validation subset. The system can use the 70% success rate to compute a performance indicator for the objective function. The performance indicator for the objective function can then be used to compute a quality score for sample size S on cross validation round i.

The system determines whether further cross validation rounds remain (440). If more cross validation rounds remain, the sample size S can remain the same, and the system repartitions the dataset into a different training subset and a different validation subset (branch to 405). In some implementations, the cross validation process ends when all elements in the dataset have been used once in the validation subset.

If no cross validation rounds remain, the system averages the quality scores from the cross validation rounds to compute an overall quality score for sample size S (445). The system can store the overall quality score for sample size S for later comparison with other overall quality scores for other sample sizes.

The system determines whether overall quality scores should be computed for more values of the sample size S (450). If more sample values remain, the system increments the sample size S (455), and the system repartitions the dataset into a new training subset and validation subset (branch to 405).

If overall quality scores for all sample sizes have been computed, the system stores the quality scores for sample sizes that resulted in the best overall quality score for the objective function (460). For example, a sample size of five can be stored because it resulted in 95% of image triplets in the validation set being correctly ranked, which might be more than any other sample size.

After computing the optimal sample size, the system can use the sample size to choose a final set of hash functions for performing a particular task using an objective function. Using the optimal sample size can help prevent effects of overtraining and thus improve the ability of the objective function to generalize to unseen data.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
computing one or more first performance indicators that indicate a likelihood or a probability of an objective function correctly performing a task, wherein the one or more first performance indicators are computed on each of one or more sets of input data elements using a set of hash functions;
computing a first overall performance indicator using each of the computed first performance indicators;
adding a candidate hash function to the set of hash functions to generate a second set of hash functions;
computing one or more second performance indicators that indicate a likelihood or a probability of the objective function correctly performing the task, wherein the one or more second performance indicators are computed on each of the one or more sets of input data elements using the second set of hash functions;
computing a second overall performance indicator using each of the computed second performance indicators; and
computing, using the first overall performance indicator and the second overall performance indicator, a score that indicates a degree to which the candidate hash function improves a performance of the objective function.

2. The method of claim 1, wherein the objective function classifies the sets of input data elements using the set of hash functions and the first or second performance indicator is a likelihood of a correct classification.

3. The method of claim 2, wherein the first or second overall performance indicator is a product of the first performance indicator and the second performance indicator or a sum of a logarithm of the first performance indicator and the second performance indicator.

4. The method of claim 3, wherein the score is based on a difference in log likelihood between the second overall performance indicator and the first overall performance indicator.

5. The method of claim 1, wherein the objective function ranks the sets of input data elements using the set of hash functions and the first or second performance indicator is a likelihood of a correct ranking.

6. The method of claim 5, wherein the sets of input data elements are image training triplets, wherein each image training triplet includes a query image Q, a first image A, and a second image B, wherein the first or second performance indicator is a measure of the likelihood that a distance function using the set of hash functions will correctly rank the query image Q of each image training triplet as more similar to the first image A of each image training triplet than to the second image B of each image training triplet.

7. The method of claim 6, wherein the likelihood of a correct triplet ranking is computed based at least in part on a distance between each Q and each A and a distance between each Q and each B.

8. The method of claim 1, wherein the score is based on a difference between the first overall performance indicator and the second overall performance indicator.

9. The method of claim 1, wherein the first or second overall performance indicator is a product of the first performance indicator and the second performance indicator or a sum of a logarithm of the first performance indicator and the second performance indicator.

10. A system comprising:
one or more computers and one or more storage devices storing instructions that are operable, when executed by the one or more computers, to cause the one or more computers to perform operations comprising:
computing one or more first performance indicators that indicate a likelihood or a probability of an objective function correctly performing a task, wherein the one or more first performance indicators are computed on each of one or more sets of input data elements using a set of hash functions;
computing a first overall performance indicator using each of the computed first performance indicators;
adding a candidate hash function to the set of hash functions to generate a second set of hash functions;
computing one or more second performance indicators that indicate a likelihood or a probability of the objective function correctly performing the task, wherein the one or more second performance indicators are computed on each of the one or more sets of input data elements using the second set of hash functions;
computing a second overall performance indicator using each of the computed second performance indicators; and
computing, using the first overall performance indicator and the second overall performance indicator, a score that indicates a degree to which the candidate hash function improves a performance of the objective function.

11. The system of claim 10, wherein the objective function classifies the sets of input data elements using the set of hash functions and the first or second performance indicator is a likelihood of a correct classification.

12. The system of claim 11, wherein the first or second overall performance indicator is a product of the first performance indicator and the second performance indicator or a sum of a logarithm of the first performance indicator and the second performance indicator.

13. The system of claim 12, wherein the score is based on a difference in log likelihood between the second overall performance indicator and the first overall performance indicator.

14. The system of claim 10, wherein the objective function ranks the sets of input data elements using the set of hash functions and the first or second performance indicator is a likelihood of a correct ranking.

15. The system of claim 14, wherein the sets of input data elements are image training triplets, wherein each image training triplet includes a query image Q, a first image A, and a second image B, wherein the first or second performance indicator is a measure of the likelihood that a distance function using the set of hash functions will correctly rank the query image Q of each image training triplet as more similar to the first image A of each image training triplet than to the second image B of each image training triplet.

16. The system of claim 15, wherein the likelihood of a correct triplet ranking is computed based at least in part on a distance between each Q and each A and a distance between each Q and each B.

17. The system of claim 10, wherein the score is based on a difference between the first overall performance indicator and the second overall performance indicator.

18. The system of claim 10, wherein the first or second overall performance indicator is a product of the first performance indicator and the second performance indicator or a sum of a logarithm of the first performance indicator and the second performance indicator.

19. A tangible, non-transitory computer-readable medium encoded with instructions for causing one or more processors to perform operations comprising:
computing one or more first performance indicators that indicate a likelihood or a probability of an objective function correctly performing a task, wherein the one or more first performance indicators are computed on each of one or more sets of input data elements using a set of hash functions;
computing a first overall performance indicator using each of the computed first performance indicators;
adding a candidate hash function to the set of hash functions to generate a second set of hash functions;
computing one or more second performance indicators that indicate a likelihood or a probability of the objective function correctly performing the task, wherein the one or more second performance indicators are computed on each of the one or more sets of input data elements using the second set of hash functions;
computing a second overall performance indicator using each of the computed second performance indicators; and
computing, using the first overall performance indicator and the second overall performance indicator, a score that indicates a degree to which the candidate hash function improves a performance of the objective function.

\* \* \* \* \*